United States Patent
Bunnell et al.

(10) Patent No.: US 12,491,792 B2
(45) Date of Patent: Dec. 9, 2025

(54) SYSTEMS AND METHODS FOR MONITORING HIGH VOLTAGE EXPOSURE HOURS OF A HIGH VOLTAGE SYSTEM OF AN ELECTRIC VEHICLE

(71) Applicant: GM GLOBAL TECHNOLOGY OPERATIONS LLC, Detroit, MI (US)

(72) Inventors: Justin Bunnell, Farmington Hills, MI (US); Yanyan Zhang, Troy, MI (US); Andrew M. Zettel, Port Moody (CA); Ziad Shounia, West Bloomfield, MI (US); Shanshan Li Peer, Ann Arbor, MI (US); James Nicholson, Albion, MI (US); Ryan B. Moulliet, Farmington Hills, MI (US); Matthew Dzurka, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 18/512,778

(22) Filed: Nov. 17, 2023

(65) Prior Publication Data
US 2025/0162446 A1 May 22, 2025

(51) Int. Cl.
*B60L 58/10* (2019.01)
*B60L 1/00* (2006.01)
(Continued)

(52) U.S. Cl.
CPC .......... *B60L 58/10* (2019.02); *B60L 1/00* (2013.01); *B60L 50/60* (2019.02); *G01R 31/3842* (2019.01); *B60L 2250/16* (2013.01)

(58) Field of Classification Search
CPC .......... B60L 58/00; B60L 58/10; B60L 58/12; B60L 58/13; B60L 58/14; B60L 58/16;
(Continued)

(56) References Cited

U.S. PATENT DOCUMENTS

2015/0226808 A1* 8/2015 Doerr ............... B60L 50/60
702/63
2017/0101027 A1* 4/2017 Zhou ................ B60L 58/13
(Continued)

FOREIGN PATENT DOCUMENTS

DE 102018131626 A1 6/2019
DE 102022118744 A1 2/2023

OTHER PUBLICATIONS

Bishop et al., Evaluating the impact of V2G services on the degradation of batteries in PHEV and EV, 2013, Applied Energy (Year: 2013).*

*Primary Examiner* — Ramya P Burgess
*Assistant Examiner* — Sara J Lewandroski
(74) *Attorney, Agent, or Firm* — Ingrassia Fisher & Lorenz, LLP | IF&L

(57) ABSTRACT

Methods and systems are provided for monitoring high voltage (HV) exposure hours of a HV system in an electric vehicle (EV). Projected HV exposure hours is generated at one of a future vehicle age and a future EV mileage and is based on current HV exposure hours and historical HV exposure hours. The current HV exposure hours and the historical HV exposure hours are based on use of the battery system to supply power to vehicle propulsion loads and the at least one of offboard vehicle loads and onboard accessory loads. When the projected HV exposure hours is greater than a HV exposure hour threshold, a HV exposure hour alert associated with limitations in connection with the use of the battery system to supply power to the at least one of the offboard vehicle loads and the onboard accessory loads is generated for display on a display device.

20 Claims, 8 Drawing Sheets

(51) Int. Cl.
*B60L 50/60* (2019.01)
*G01R 31/3842* (2019.01)

(58) Field of Classification Search
CPC .......... B60L 58/18; B60L 58/25; B60L 50/60;
B60L 1/00; B60L 1/003; B60L 1/006;
B60L 1/02; B60L 1/04; B60L 1/06; B60L
1/08; B60L 1/10; B60L 1/12; B60L 1/14;
B60L 1/16; B60L 1/20; B60L 3/00; B60L
3/0046; B60L 3/0069; B60L 3/04; B60L
55/00; B60L 2240/80; B60L 2250/00;
B60L 2250/10; B60L 2250/12; B60L
2250/16; G01R 31/3842
See application file for complete search history.

(56) References Cited

U.S. PATENT DOCUMENTS

| | | | |
|---|---|---|---|
| 2019/0176639 A1* | 6/2019 | Kumar | G07C 5/0808 |
| 2019/0176640 A1* | 6/2019 | Lee | B60K 35/26 |
| 2020/0070683 A1* | 3/2020 | Ishikawa | B60L 58/18 |
| 2023/0044022 A1* | 2/2023 | Salter | B60L 53/14 |
| 2023/0094310 A1* | 3/2023 | Zhao | B60L 58/14 |
| | | | 701/22 |
| 2023/0222852 A1* | 7/2023 | Duan | G06N 5/022 |
| | | | 701/31.9 |
| 2023/0311694 A1* | 10/2023 | Saita | B60L 53/67 |
| | | | 700/295 |
| 2023/0384391 A1* | 11/2023 | Kwak | G01R 31/371 |
| 2024/0345170 A1* | 10/2024 | Jang | G01R 31/392 |
| 2025/0091475 A1* | 3/2025 | Morishima | B60L 53/52 |

* cited by examiner

SYSTEMS AND METHODS FOR MONITORING HIGH VOLTAGE EXPOSURE HOURS OF A HIGH VOLTAGE SYSTEM OF AN ELECTRIC VEHICLE

INTRODUCTION

The technical field generally relates to vehicles, and more particularly relates to systems and methods for monitoring high voltage exposure hours of a high voltage system of an electric vehicle.

Electric vehicles (EV) typically include a rechargeable energy storage system (RESS) for powering the electric components that facilitate propulsion of the EV. An example of a RESS is a battery system. The battery system may include a battery pack including one or more battery modules. Each battery module may include multiple battery cells. In addition to providing power for propulsion of the EV, the battery system may be used to power onboard accessory loads of the EV. An example of an onboard accessory load is a connected camera. The battery system may also be used to power offboard vehicle loads when the EV is stationary. The battery system is operably coupled to a HV system. The HV system enables the battery system to supply power to propulsion loads, onboard accessory loads, and offboard vehicle loads.

Examples of offboard vehicle loads include vehicle to grid (V2G), vehicle to home (V2H), vehicle to vehicle (V2V), vehicle to load (V2L), power take off (PTO), and electronic PTO. The offboard vehicle loads may be collectively referred to as vehicle to X (V2X) loads. The ability to supply power to V2X loads enables the EV to operate as both a mode of transportation and a power source. However, the useful life of the HV system may be affected by use of the battery system to power onboard accessory loads and/or offboard vehicle loads in addition to the propulsion loads. The assessment of the HV systems in connection with HV system warranties often do not identify the impact of powering of onboard accessory loads and/or offboard vehicles loads.

Accordingly, it is desirable to provide improved methods and systems for monitoring high voltage exposure hours of a high voltage system based on use of the battery system to power onboard accessory loads and/or offboard vehicle loads in addition to the propulsion loads. Other desirable features and characteristics will become apparent from the subsequent detailed description and the appended claims, taken in conjunction with the accompanying drawings and the foregoing technical field and background.

SUMMARY

In various embodiments, a high voltage (HV) exposure hour monitoring system of an electric vehicle (EV) includes at least one processor and at least one memory communicatively coupled to the at least one processor. The at least one memory includes instructions that upon execution by the at least one processor, cause the at least one processor to: generate projected HV exposure hours for a HV system of the EV at one of a future vehicle age and a future EV mileage, wherein: the HV system is operably coupled to a battery system of the EV and is configured to enable a supply of power from the battery system to propulsion loads and at least one of offboard vehicle loads and onboard accessory loads; the projected HV exposure hours is based on current HV exposure hours and historical HV exposure hours for the HV system; and the current HV exposure hours and the historical HV exposure hours are based on use of the battery system to supply power to the propulsion loads and the at least one of offboard vehicle loads and onboard accessory loads; determine whether the projected HV exposure hours is greater than a HV exposure hour threshold at the one of the future vehicle age and the future EV mileage; and generate a HV exposure hour alert associated with limitations in connection with the use of the battery system to supply power to the at least one of the offboard vehicle loads and the onboard accessory loads for display on a display device of the EV based on the determination.

In at least one embodiment, the HV exposure hour threshold is a first HV exposure hour threshold value and the at least one memory includes further instructions that upon execution by the at least one processor, cause the at least one processor to: based on a determination that the projected HV exposure hours is greater than the first HV exposure hour threshold value; disable an ability of the battery system to supply power to all of the at least one of the offboard vehicle loads and the onboard accessory loads; and generate the HV exposure hour alert, the HV exposure hour alert including a first notification that the ability of battery system to supply power to the all of the at least one of the offboard vehicle load and the onboard accessory load has been disabled.

In at least one embodiment, the HV exposure hour threshold is a first HV exposure hour range between the first HV exposure hour threshold value and a second HV exposure hour threshold value, the second HV exposure hour threshold value being less than the first HV exposure hour threshold value; and based on a determination that the projected HV exposure hours falls within the first HV exposure hour threshold range, the at least one memory includes further instructions that upon execution by the at least one processor, cause the at least one processor to: limit an amount of power that can be supplied by the battery system to a first subset of the at least one of the offboard vehicle loads and the onboard accessory loads; disable an ability of the battery system to supply power to a second subset of the at least one of the offboard vehicle loads and the onboard accessory loads; and generate the HV exposure hour alert, the HV exposure hour alert including a second notification that the amount of power that can be supplied by the battery system to the first subset of the at least one of the offboard vehicle loads and the onboard accessory loads has been limited and that the ability of the battery system to supply power to a second subset of the at least one of the offboard vehicle loads and the onboard accessory loads has been disabled.

In at least one embodiment, the HV exposure hour threshold is a second HV exposure hour threshold range between the second HV exposure hour threshold value and a third HV exposure hour threshold value, the third HV exposure hour threshold value being less than the second HV exposure hour threshold value; and based on a determination that the projected HV exposure hours fall within the second HV exposure hour threshold range, the at least one memory includes further instructions that upon execution by the at least one processor, cause the at least one processor to: recommend limiting use of the battery system to supply power to the at least one of the offboard vehicle loads and the onboard accessory loads; limit an amount of power that can be supplied by the battery system to a third subset of the at least one of the offboard vehicle loads and the onboard accessory loads; and generate the HV exposure hour alert, the HV exposure hour alert comprising a third notification to recommend limiting use of the battery system to supply power to the at least one of the offboard vehicle loads and the onboard accessory loads and that the amount of power that can be supplied to the third subset of the at least one of the offboard vehicle loads and the onboard accessory loads has been limited.

In at least one embodiment, the HV exposure hour threshold is a third HV exposure hour threshold range between the third HV exposure hour threshold value and a fourth HV exposure hour threshold value, the fourth HV exposure hour threshold value being less than the third HV exposure hour threshold value; and based on a determination that the projected HV exposure hours fall within the third HV exposure hour threshold range, the at least one memory includes further instructions that upon execution by the at least one processor, cause the at least one processor to generate the HV exposure hour alert, the HV exposure hour alert including a fourth notification to recommend limiting use of the battery system to supply power to the at least one of the offboard vehicle loads and the onboard accessory loads.

In at least one embodiment, the at least one memory includes further instructions that upon execution by the at least one processor, cause the at least one processor to: generate the projected HV exposure hours at the future vehicle age, wherein the projected HV exposure hours is based on the current HV exposure hours and the historical projected HV exposure hours corresponding to historical vehicle ages; and determine whether the projected HV exposure hours is greater than the HV exposure hour threshold at the future vehicle age.

In at least one embodiment, the at least one memory includes further instructions that upon execution by the at least one processor, cause the at least one processor to generate the projected HV exposure hours at the future vehicle age, wherein the projected HV exposure hours is based on the current HV exposure hours and the historical HV exposure hours corresponding to historical vehicle ages within a pre-defined vehicle age window.

In at least one embodiment, the future vehicle age is a vehicle age warranty.

In at least one embodiment, the at least one memory includes further instructions that upon execution by the at least one processor, cause the at least one processor to: generate the projected HV exposure hours at the future EV mileage, wherein the projected HV exposure hours is based on the current HV exposure hours at a current EV mileage and the historical HV exposure hours corresponding to historical EV mileages; and determine whether the projected HV exposure hours is greater than the HV exposure hour threshold at the future EV mileage.

In at least one embodiment, the at least one memory includes further instructions that upon execution by the at least one processor, cause the at least one processor to generate the projected HV exposure hours at the future EV mileage, wherein the projected HV exposure hours is based on the current HV exposure hours and the historical HV exposure hours corresponding to historical EV mileages within a pre-defined EV mileage window.

In at least one embodiment, the future EV mileage is a vehicle warranty mileage.

In at least one embodiment, the at least one memory includes further instructions that upon execution by the at least one processor, cause the at least one processor to: determine the current HV exposure hours; determine a current vehicle age; determine a current EV mileage; and identify the HV exposure hour threshold associated with the current HV exposure hours, the current vehicle age, and the current EV mileage using pre-defined relationships between HV exposure hours, vehicle ages, EV mileages, and HV exposure hour thresholds.

In at least one embodiment, the at least one memory includes further instructions that upon execution by the at least one processor, cause the at least one processor to: generate a first projected HV exposure hours at the future vehicle age, wherein the first projected HV exposure hours is based on the current HV exposure hours and historical HV exposure hours corresponding to historical vehicle ages; generate a second projected HV exposure hours at the future EV mileage, wherein the second projected HV exposure hours is based on the current HV exposure hours and historical HV exposure hours corresponding to historical EV mileages; determine whether both the first projected HV exposure hours and the second projected HV exposure hours are greater than the HV exposure hour threshold; and generate the HV exposure hour alert based on the determination.

In at least one embodiment, at least one of the onboard accessory loads includes a connected camera system.

In at least one embodiment, the offboard vehicle loads includes at least one of a vehicle to grid (V2G), vehicle to home (V2H), vehicle to vehicle (V2V), vehicle to load (V2L), power take off (PTO), and electronic PTO.

In at least one embodiment, the at least one memory includes further instructions that upon execution by the at least one processor, cause the at least one processor to: generate the projected HV exposure hours at the one of the future vehicle age and the future EV mileage, wherein: the projected HV exposure hours is based on the current HV exposure hours and the historical HV exposure hours; and the current HV exposure hours and the historical HV exposure hours are based at least in part on the use of the battery system to supply power to at least one of an offboard vehicle loads and an onboard accessory loads; generate another projected HV exposure hours at the one of the future vehicle age and the future EV mileage, wherein the another projected HV exposure hours is based on discontinuation of the use of the battery system to supply power to the at least one of the offboard vehicle loads and the onboard accessory loads; determine whether the projected HV exposure hours is greater than the HV exposure hour threshold and the another projected HV exposure hours is less than the HV exposure hour threshold; and generate the HV exposure hour alert based on the determination.

In at least one embodiment, the at least one memory includes further instructions that upon execution by the at least one processor, cause the at least one processor to: generate a projected number of cycles of HV contactors at the one of the future vehicle age and the future EV mileage, wherein: the HV system is operably coupled to the battery system via the HV contactors; the projected number of cycles is based on a current number of cycles and historical numbers of cycles; and the current number of cycles and the historical numbers of cycles are based on the closing of the HV contactors to enable the battery system to supply power to the propulsion loads and the at least one of offboard vehicle loads and onboard accessory loads; determine whether the projected number of cycles is greater than a cycle threshold at the one of the future vehicle age and the future EV mileage; and generate a cycle alert associated with limitations in connection with the use of the battery system to supply power to the at least one of the offboard vehicle loads and the onboard accessory loads for display on a display device of the EV based on the determination.

In at least one embodiment, the at least one memory includes further instructions that upon execution by the at least one processor, cause the at least one processor to: generate the current HV exposure hours based on a sum of the time durations that the HV contactors have been closed during the HV cycles; and generate each of the historical HV exposure hours based on sums of the time durations that the HV contactors have been closed at each of the historical vehicle ages.

In various embodiments, a method for monitoring high voltage (HV) exposure hours of an electric vehicle (EV) includes: generating projected HV exposure hours for a HV system of the EV at one of a future vehicle age and a future EV mileage, wherein: the HV system is operably coupled to a battery system of the EV and is configured to enable a supply of power from the battery system to propulsion loads and at least one of offboard vehicle loads and onboard accessory loads; the projected HV exposure hours is based on current HV exposure hours and historical HV exposure hours for the HV system; and the current HV exposure hours and the historical HV exposure hours are based on use of the battery system to supply power to the propulsion loads and the at least one of offboard vehicle loads and onboard accessory loads; determining whether the projected HV exposure hours is greater than a HV exposure hour threshold at the one of the future vehicle age and the future EV mileage; and generating a HV exposure hour alert associated with limitations in connection with the use of the battery system to supply power to the at least one of the offboard vehicle loads and the onboard accessory loads for display on a display device of the EV based on the determination.

In various embodiments, an electric vehicle (EV) includes at least one processor; and at least one memory communicatively coupled to the at least one processor. The at least one memory includes instructions that upon execution by the at least one processor, cause the at least one processor to: generate projected HV exposure hours for a HV system of the EV at one of a future vehicle age and a future EV mileage, wherein: the HV system is operably coupled to a battery system of the EV and is configured to enable a supply of power from the battery system to propulsion loads and at least one of offboard vehicle loads and onboard accessory loads; the projected HV exposure hours is based on current HV exposure hours and historical HV exposure hours for the HV system; and the current HV exposure hours and the historical HV exposure hours are based on use of the battery system to supply power to the propulsion loads and the at least one of offboard vehicle loads and onboard accessory loads; determine whether the projected HV exposure hours is greater than a HV exposure hour threshold at the one of the future vehicle age and the future EV mileage; and generate a HV exposure hour alert associated with limitations in connection with the use of the battery system to supply power to the at least one of the offboard vehicle loads and the onboard accessory loads for display on a display device of the EV based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
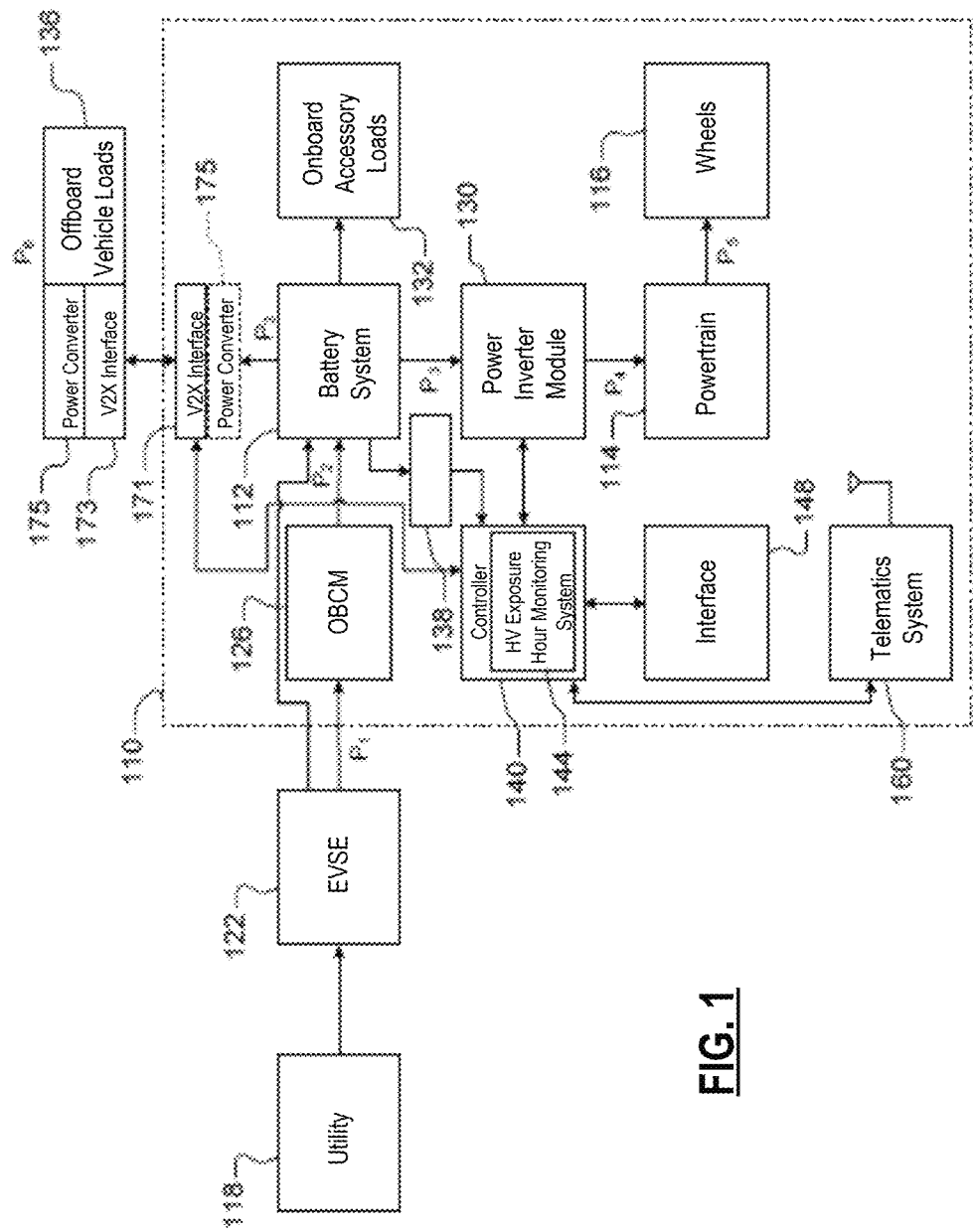
FIG. 1 is a functional block diagram of a system including an electric vehicle (EV) including a high voltage (HV) exposure hour monitoring system in accordance with at least one embodiment.

Referring to FIG. 1, a functional block diagram of a system including an electric vehicle (EV) including a high voltage (HV) exposure hour monitoring system 144 in accordance with at least one embodiment is shown. The EV 110 includes a battery system 112. An example of a battery system 112 is a battery pack such as a high voltage (HV) battery. The EV 110 includes a powertrain 114 including an electric motor, a gearbox, and/or a differential to propel one or more wheels 116 of the EV 110. A utility 118 or other power source supplies power to electric vehicle supply equipment (EVSE) 122. In various embodiments, the EVSE 122 supplies power from the utility 118 to an on-board charging module (OBCM) 126 that controls charging of the battery system 112. In various embodiments, direct current (DC) fast charging (DCFC) is used and the OBCM 126 is bypassed.

During driving, the battery system 112 supplies power through a power inverter module 130 to the powertrain 114 to propel one or more wheels 116 of the EV 110. The battery system 112 also supplies power to onboard accessory loads 132. An example of an onboard accessory load is a connected camera system. In at least one embodiment, the battery system 112 can also be used to supply power to offboard vehicle loads 136 (also referred to as V2X components or V2X loads). Examples of offboard vehicle loads 136 include, but are not limited to, vehicle to grid (V2G), vehicle to home (V2H), vehicle to vehicle (V2V), vehicle to load (V2L), a power take off (PTO), and an electric PTO. The EV 110 can operate as both a power source and a mode of transportation.

One or more sensors 138 such as current and/or voltage sensors sense power output by the battery system 112 to the powertrain 114, the onboard accessory loads 132, and/or offboard vehicle loads 136. In various embodiments, a controller 140 includes a HV exposure hour monitoring system 144. The controller 140 receives output(s) from the one or more sensors 138. A HV system is operably coupled to the battery system 112 of the EV 110 and is configured to enable supply of power from the battery system 112 to propulsion loads, onboard accessory loads 132, and offboard vehicle loads 136. The HV system, may for example, include the power inverter module 130 and a power converter 175. An example of a propulsion load is the powertrain 114. HV exposure hours are based on the use of the battery system 112 to supply power to the propulsion loads, the accessory loads 132, and offboard vehicle loads 136. The HV system is operably coupled to the battery system 112 via HV contactors.

An interface 148 includes a display and input device (such as buttons or touch screen) such as a dashboard display or infotainment display. The display displays HV exposure hour alerts, HV exposure hour data, and notifications associated with HV exposure hours. The interface 148 allows a customer to change settings controlling the power supplied to the offboard vehicle loads 136 and/or the onboard accessory loads 132. An example of an onboard accessory load 132 is a connected camera. In various embodiments, the interface 148 enables a customer to selectively inactivate, restrict, or disable the EV 110 from supplying power to offboard vehicle loads 136 and/or onboard accessory loads 132. A telematics system 160 may be used to wirelessly communicate with a remote server to exchange information associated with the HV exposure hours and warranty information with a manufacturer, and/or setting changes, restrictions, and/or manufacturer recommendations.

In various embodiments, HV exposure hour alerts are provided via the interface 148 recommending limiting the use of the battery system 112 to power offboard vehicle loads 136 and/or onboard accessory loads 132 when the HV exposure hour monitoring system 144 determines that the HV exposure hours are high enough to indicate that the HV system may be degrading at a rate that may void a warranty associated with the HV system. In various embodiments, a disable option is provided via the interface 148 to disable the ability of the battery system 112 to supply power output to offboard vehicle loads 136 and/or onboard accessory loads 132 when the HV exposure hour monitoring system 144 determines that the HV exposure hours are high enough to indicate that the HV system may be degrading at a rate that may void a warranty associated with the HV system. In various embodiments, the ability to use the battery system 112 to supply power to offboard vehicle loads 136 and/or onboard accessory loads 132 is automatically disabled when the HV exposure hour monitoring system 144 determines that the HV exposure hours are high enough to indicate that the HV system may be degrading at a rate that may void a warranty associated with the HV system.

In various embodiments, the EV 110 includes a vehicle V2X interface 171 configured to exchange information with an external V2X interface 173 of the offboard vehicle loads 136. In various embodiments, the power converter 175 converts power output by the battery system 112 for use by the offboard vehicle loads 136. In various embodiments, the power converter 175 is arranged on a vehicle side of the EV 110. In various embodiments, the exchanged information include an identification of a type of an offboard vehicle load 136, power needed, and/or other information. The controller 140 and the interface 148 are configured to set an active/inactive state for supplying power from the battery system 112 to various types of offboard vehicle loads 136 and/or to set limits on the power supplied within a predetermined period (e.g. one or more hours, days, weeks, months, years, other period). In various embodiments, the manufacturer can override customer settings associated with the battery system 112 based on the HV exposure hours and/or provide recommendations that can be used as a default or selected by the customer.

Figure 2:
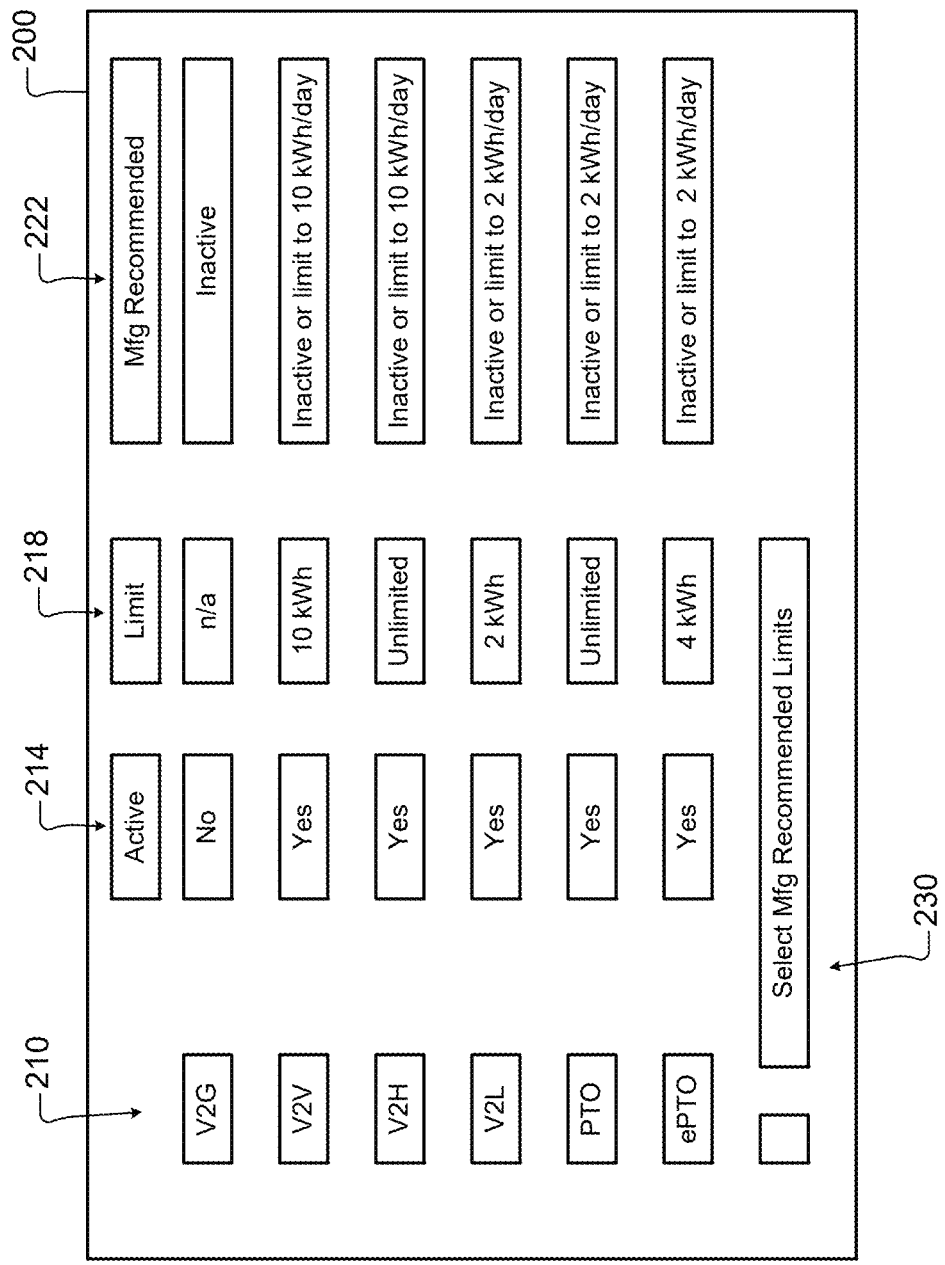
FIG. 2 illustrates an example of an interface for controlling power supplied to various offboard vehicle loads in accordance with at least one embodiment.

Referring to FIG. 2, a display interface 200 that can be accessed by the customer via the infotainment system, instrument panel or other device for setting an active/inactive state for supplying power to an offboard vehicle load 136 is shown. The display interface 200 allows the customer to select and adjust the offboard vehicle load 210, active/inactive states 214 for the offboard vehicle loads 210, and/or daily power limits 218 for each of the offboard vehicle loads 136. In some examples, the manufacturer's recommended limits for each of the offboard vehicle loads at 222 are provided. In some examples, a customer can select the manufacturer's recommended daily limits using an input 230 such as a check box. Furthermore, the manufacturer can override a user selection by disabling the selectable active/inactive states 214 for the offboard vehicle loads 210 and/or set other daily power limits 218 for each of the offboard vehicle loads remotely based on SOH of the battery system 112, projected SOH of the battery system 112, the total EV mileage, the virtual EV mileage, and/or the driven EV mileage.

Figure 3:
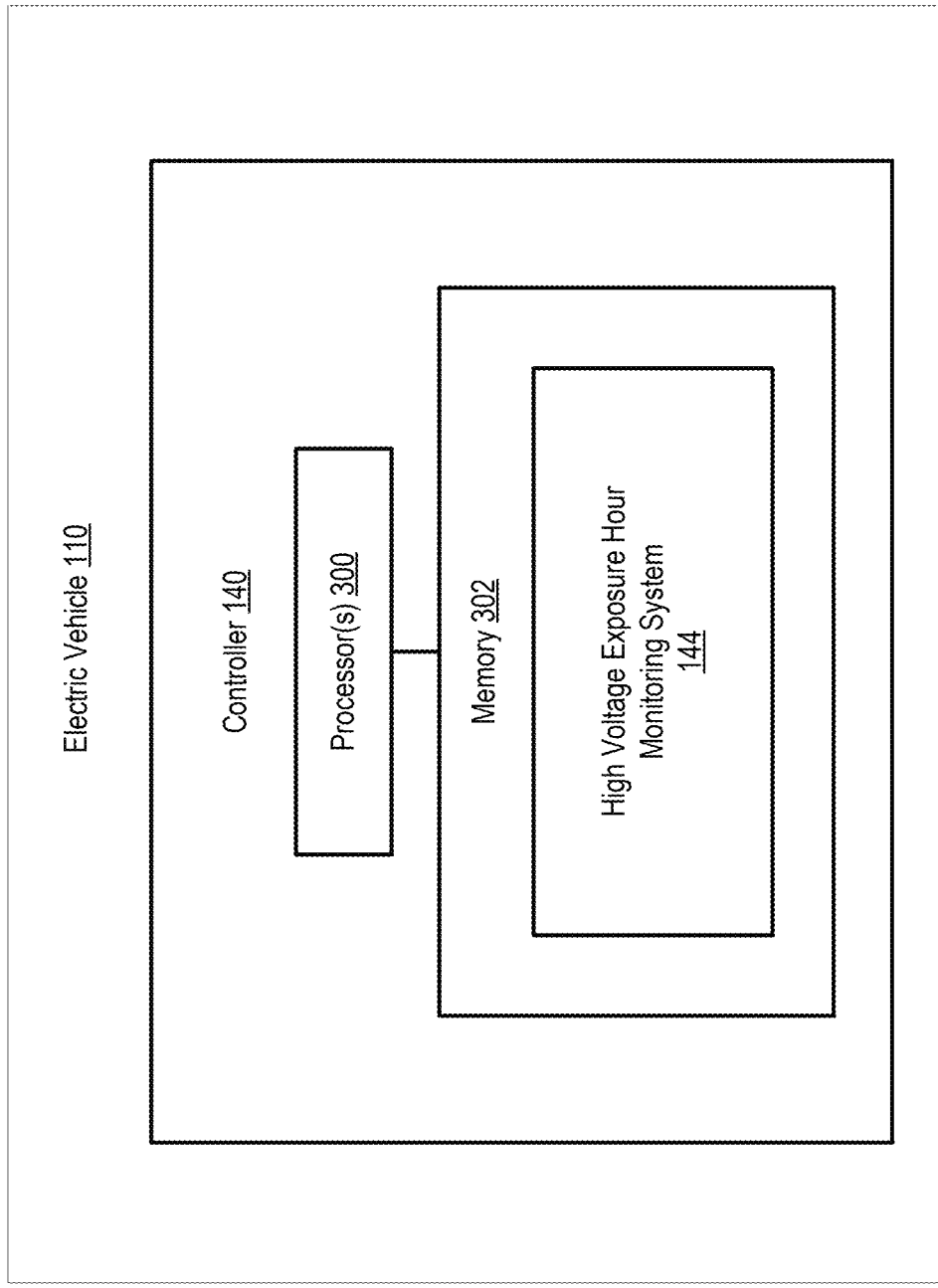
FIG. 3 is a functional block diagram of an EV including a HV exposure hour monitoring system in accordance with at least one embodiment.

Referring to FIG. 3, a functional block diagram of an EV including a HV exposure hour monitoring system 144 in accordance with at least one embodiment is shown. The EV 110 includes a controller 140. The controller 140 includes at least one processor 300, at least one memory 302. The at least one processor 300 is communicatively coupled to the at least one memory 302. The at least one processor 300 is a programable device that includes one or more instructions stored in or associated with the at least one memory 302. The at least one memory 302 includes instructions that the processor(s) 300 is configured to execute.

The at least one memory 302 is a computer readable storage device or media. The at least one processor 300 can be any custom made or commercially available processor, a central processing unit (CPU), a graphics processing unit (GPU), an auxiliary processor among several processors, a semiconductor-based microprocessor (in the form of a microchip or chip set), a macroprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor(s) 300 is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the HV exposure hour monitoring system 144. The instructions may include one or more separate programs, each of which includes an ordered listing of executable instructions for implementing logical functions. The instructions, when executed by the processor(s) 300 perform logic, calculations, methods and/or algorithms for implementing the monitoring of the HV exposure hours of a HV system of the EV 110.

Figure 4:
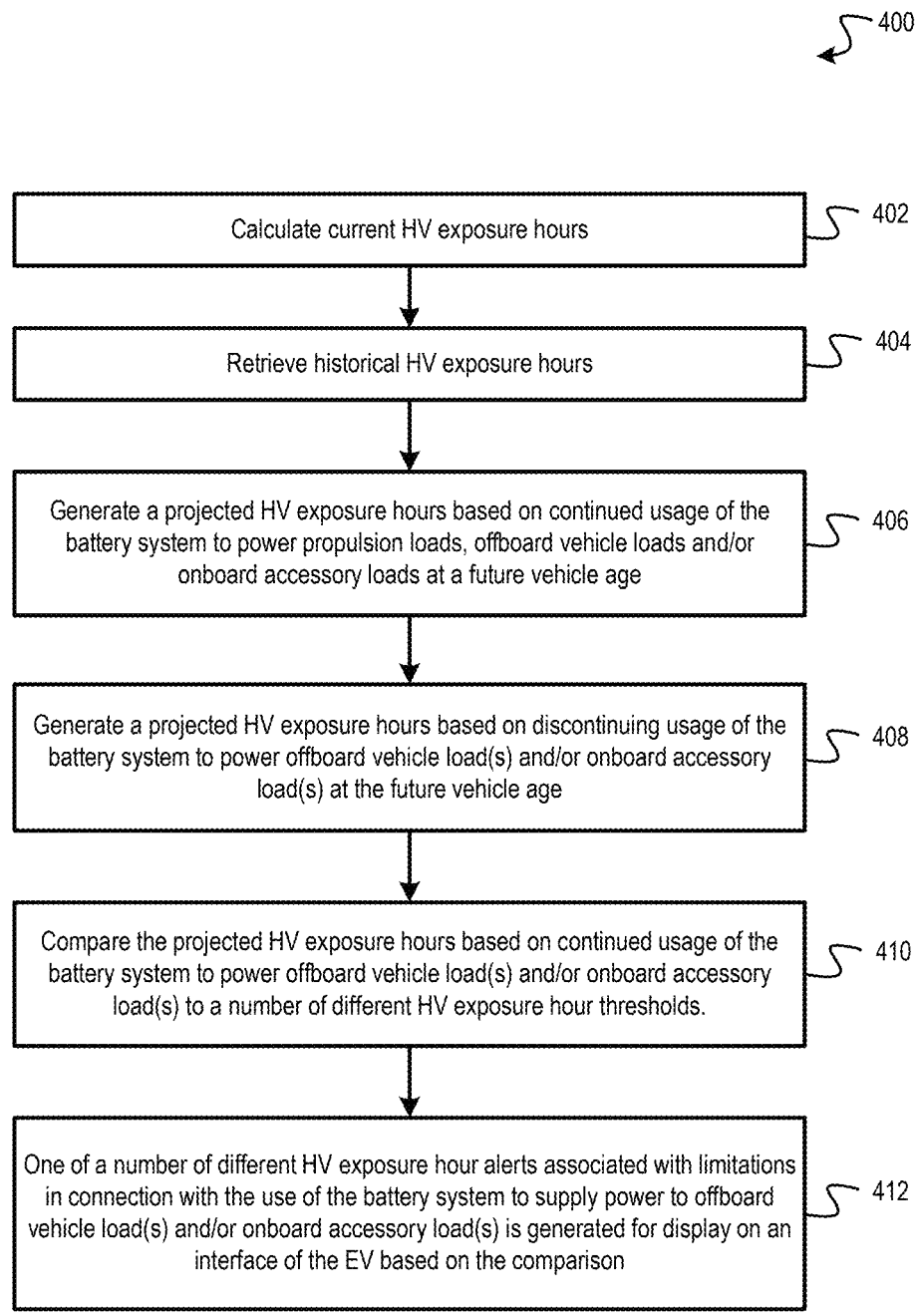
FIG. 4 is a flowchart representation of a method of monitoring HV exposure hours as a function of vehicle age in accordance with at least one embodiment.

Referring to FIG. 4, a flowchart representation of a method 400 of monitoring HV exposure hours as a function of vehicle age in accordance with at least one embodiment is shown. The method 400 will be described with reference to an exemplary implementation of the HV exposure hour monitoring system 144. As can be appreciated in light of the disclosure, the order of operation within the method 400 is not limited to the sequential execution as illustrated in FIG. 4 but may be performed in one or more varying orders as applicable and in accordance with the present disclosure.

At 402, a current HV exposure hours is calculated by the HV exposure hour monitoring system 144. HV contactors operably couple the battery system 112 to the HV system. The HV system includes a plurality of HV components. Examples of HV components include, but are not limited to, inverters, refrigerant compressors, resistive heaters, and charging modules. The battery system 112 is operably coupled to the HV system via HV contactors. The HV contactors can be placed in an open state or in a closed state. When the battery system 112 is being used to supply power to propulsion loads, onboard vehicle accessory loads 132, and/or offboard vehicle loads 136, the HV contactors that provide operable coupling between the battery system 112 and the loads are placed in a closed state. When the battery system 112 is not being used to supply power to propulsion loads, onboard vehicle accessory loads 132, and/or offboard vehicle loads 136, the HV contactors that provide operable coupling between the battery system 112 and the loads are placed in an open state. When all the HV contactors are placed in an open state, the propulsion loads, onboard vehicle accessory loads 132, and/or offboard vehicle loads 136 are depowered and isolated from the battery system 112. A cycle consists of HV contactors being placed in an open state followed by a closed state. In at least one embodiment, the current HV exposure hours is a sum of the time durations that the HV contactors have been closed during the HV cycles during a pre-defined vehicle age window. In at least one embodiment, the pre-defined vehicle age window extends from when a vehicle age of the EV 110 is zero to a current vehicle age of the EV 110.

At 404, historical HV exposure hours are retrieved by the HV exposure hour monitoring system 144. The HV exposure hours is calculated periodically at different vehicle ages of the EV 110. The periodicity may, for example, be every day, every few days, every few months, or every year. Each of these times represent a different vehicle age of the EV 110. The HV exposure hours are maintained by the HV exposure hour monitoring system 144. In at least one embodiment, the HV exposure hour monitoring system 144 retrieves all of the historical HV exposure hours starting from when the vehicle age is zero. In at least one embodiment, the HV exposure hour monitoring system 144 retrieves the historical HV exposure hours that fall within a pre-defined vehicle age window. In various embodiments, the HV exposure hours are related to use of the EV 110. If the EV 110 is leased, a first lease owner and a second vehicle owner may have different EV 110 use trends, resulting in different rates of HV exposure hour accumulation. The use of a pre-defined vehicle age window enables a filtering out of a prior customer usage (for example, the first lease owner usage) of the EV 110. For example, the first two years of the vehicle age may correspond to a lease period. The pre-defined window may extend from the vehicle age of two years to the current vehicle age. This pre-defined vehicle age window provides the HV exposure hour accumulation for the second vehicle owner by filtering out the HV exposure hour accumulation by the first lease owner. The HV exposure hour monitoring system 144 uses the historical HV exposure hours that begin at the end of the lease period and extend to the current vehicle age. In various embodiments, the pre-defined vehicle age window may be a moving window through the vehicle age time domain. The pre-defined vehicle age window is a fixed time period that moves through the vehicle age time domain.

At 406, a projected HV exposure hours based on continued usage of the battery system 112 to power offboard vehicle load(s) 136 and/or onboard accessory load(s) 132 is generated at a future vehicle age. For example, the HV system may have a manufacturer specified vehicle age warranty of 8 years. The projected HV exposure hours based on continued usage of the battery system 112 to power offboard vehicle load(s) 136 and/or onboard accessory load(s) 132 is generated at the vehicle age warranty of 8 years. The vehicle age warranty is used as the future vehicle age. The projected HV exposure hours based on continued usage of the battery system 112 to power offboard vehicle load(s) 136 and/or onboard accessory load(s) 132 is based on the current HV exposure hours and the historical HV exposure hours.

At 408, a projected HV exposure hours based on a discontinuation of usage of the battery system 112 to power offboard vehicle load(s) 136 and/or onboard accessory load(s) 132 is generated at the future vehicle age.

At 410, the projected HV exposure hours based on continued usage of the battery system 112 to power offboard vehicle load(s) 136 and/or onboard accessory load(s) 132 is compared to a number of different HV exposure hour thresholds. In various embodiments, the projected HV exposure hours based on continued usage of the battery system 112 to power offboard vehicle load(s) 136 and/or onboard accessory load(s) 132 and the projected HV exposure hours based on the discontinuation of usage of the battery system 112 to power offboard vehicle load(s) 136 and/or onboard accessory load(s) 132 is compared to a number of different HV exposure hour thresholds.

At 412, one of a number of different HV exposure hour alerts associated with limitations in connection with the use of the battery system 112 to supply power to offboard vehicle load(s) 136 and/or onboard accessory load(s) 132 is generated for display on an interface 148 of the EV 110 based on the comparison. The different HV exposure hour thresholds and associated HV exposure hour alerts will be described in greater detail below.

Figure 5:
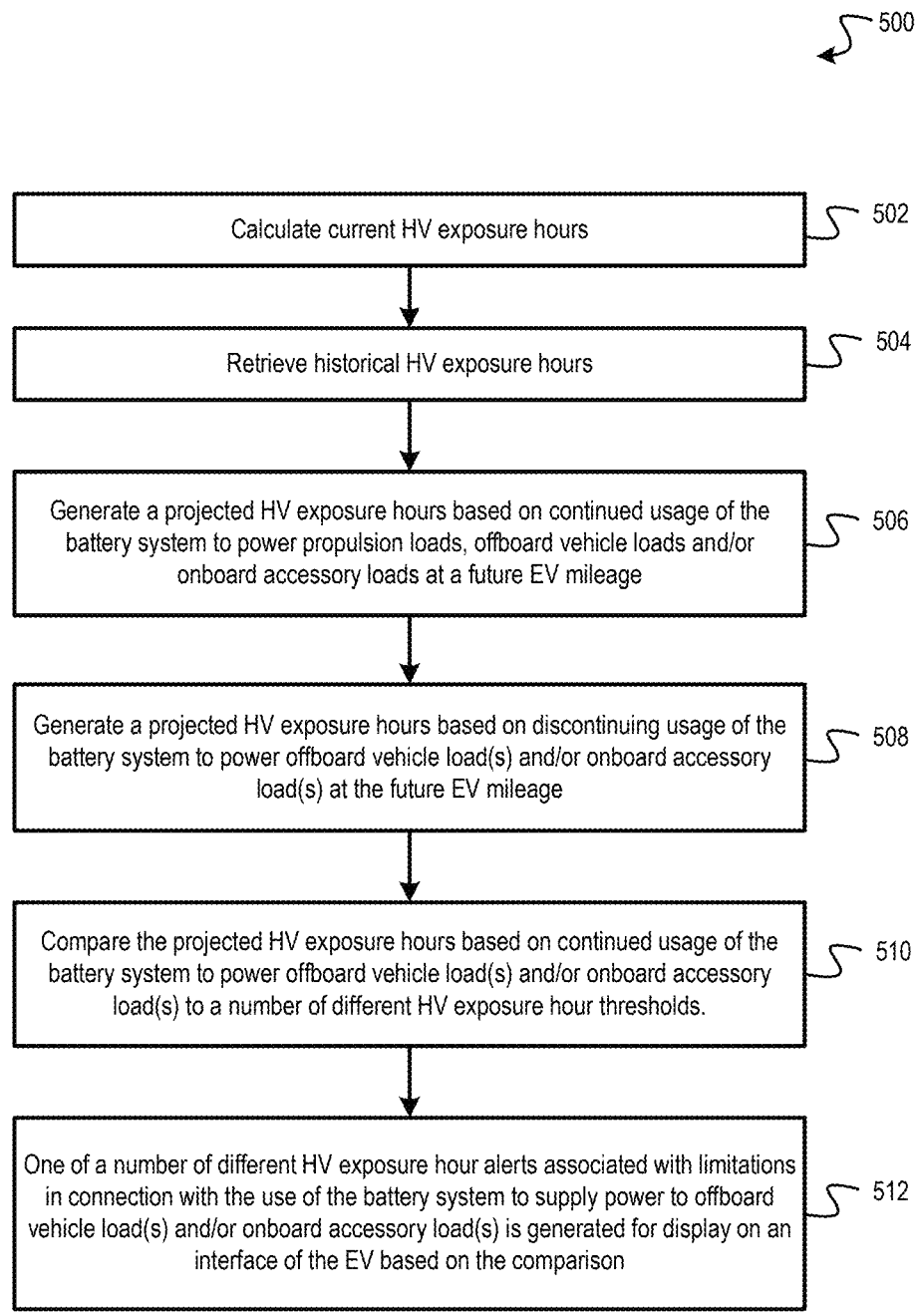
FIG. 5 is a flowchart representation of a method of monitoring HV exposure hours as a function of EV mileage in accordance with at least one embodiment.

Referring to FIG. 5, a flowchart representation of a method 500 of monitoring HV exposure hours as a function of EV mileage in accordance with at least one embodiment is shown. The method 500 will be described with reference to an exemplary implementation of the HV exposure hour monitoring system 144. As can be appreciated in light of the disclosure, the order of operation within the method 500 is not limited to the sequential execution as illustrated in FIG. 5 but may be performed in one or more varying orders as applicable and in accordance with the present disclosure.

At 502, a current HV exposure hours is calculated by the HV exposure hour monitoring system 144. The HV contactors operably couple the battery system 112 to the HV system. The HV system includes a plurality of HV components. Examples of HV components include, but are not limited to, inverters, refrigerant compressors, resistive heaters, and charging modules. The battery system 112 is operably coupled to the HV system via HV contactors. The HV contactors can be placed in an open state or in a closed state. When the battery system 112 is being used to supply power to propulsion loads, onboard vehicle accessory loads 132, and/or offboard vehicle loads 136, HV contactors that provide operable coupling between the battery system 112 and the loads are placed in a closed state. When the battery system 112 is not being used to supply power to propulsion loads, onboard vehicle accessory loads 132, and/or offboard vehicle loads 136, the HV contactors that provide operable coupling between the battery system 112 and the loads are placed in an open state. When all the HV contactors are placed in an open state, the propulsion loads, onboard vehicle accessory loads 132, and/or offboard vehicle loads 136 are depowered and isolated from the battery system 112. A cycle consists of HV contactors being placed in an open state followed by a closed state. In at least one embodiment, the current HV exposure hours is a sum of the time durations that the HV contactors have been closed during the HV cycles during a pre-defined EV mileage window. In at least one embodiment, the pre-defined period of time extends from when an EV mileage is zero to a current EV vehicle mileage.

At 504, historical HV exposure hours are retrieved by the HV exposure hour monitoring system 144. The HV exposure hours is calculated periodically at different EV mileages. The periodicity may, for example, be every pre-defined number of EV miles. For example, the HV exposure hours may be calculated every 1000 EV miles. The HV exposure hours are maintained by the HV exposure hour monitoring system 144. In at least one embodiment, the HV exposure hour monitoring system 144 retrieves all of the historical HV exposure hours starting from when the EV mileage is zero. In at least one embodiment, the HV exposure hour monitoring system 144 retrieves the historical HV exposure hours that fall within a pre-defined EV mileage window. In various embodiments, the HV exposure hours are related to use of the EV 110. If the EV 110 is leased, a first lease owner and a second vehicle owner may have different EV 110 use trends, resulting in different rates of HV exposure hour accumulation. The use of a pre-defined EV mileage window enables a filtering out of a prior customer usage (for example, the first lease owner usage) of the EV 110. For example, the first 24,000 miles of the EV mileage may correspond to a lease period. The pre-defined window may extend from the EV mileage of 24,000 miles to the current EV mileage. This pre-defined EV mileage window provides the HV exposure hour accumulation for the second vehicle owner by filtering out the HV exposure hour accumulation by the first lease owner. The HV exposure hour monitoring system 144 uses the historical HV exposure hours that begin at the end of the lease mileage and extend to the current EV mileage. In various embodiments, the pre-defined EV mileage window may be a moving window through the EV mileage distance domain. The pre-defined EV mileage window is a fixed EV mileage that moves through the EV mileage distance domain.

At 506, a projected HV exposure hours based on continued usage of the battery system 112 to power offboard vehicle load(s) 136 and/or onboard accessory load(s) 132 is generated at a future EV mileage. For example, the HV system may have a manufacturer specified vehicle mileage warranty of 100,000 miles. The projected HV exposure hours based on continued usage of the battery system 112 to power offboard vehicle load(s) 136 and/or onboard accessory load(s) 132 is generated at the vehicle mileage warranty of 100,000 miles. The vehicle mileage warranty is used as the future EV mileage. The projected HV exposure hours based on continued usage of the battery system 112 to power offboard vehicle load(s) 136 and/or onboard accessory load(s) 132 is based on the current HV exposure hours and the historical HV exposure hours.

At 508, a projected HV exposure hours based on a discontinuation of usage of the battery system 112 to power offboard vehicle load(s) 136 and/or onboard accessory load(s) 132 is generated at the future EV mileage.

At 510, the projected HV exposure hours based on continued usage of the battery system 112 to power offboard vehicle load(s) 136 and/or onboard accessory load(s) 132 is compared to a number of different HV exposure hour thresholds. In various embodiments, the projected HV exposure hours based on continued usage of the battery system 112 to power offboard vehicle load(s) 136 and/or onboard accessory load(s) 132 and the projected HV exposure hours based on the discontinuation of usage of the battery system 112 to power offboard vehicle load(s) 136 and/or onboard accessory load(s) 132 is compared to a number of different HV exposure hour thresholds.

At 512, one of a number of different HV exposure hour alerts associated with limitations in connection with the use of the battery system 112 to supply power to offboard vehicle load(s) 136 and/or onboard accessory load(s) 132 is generated for display on an interface 148 of the EV 110 based on the comparison. The different HV exposure hour thresholds and associated HV exposure hour alerts will be described in greater detail below.

Figure 6:
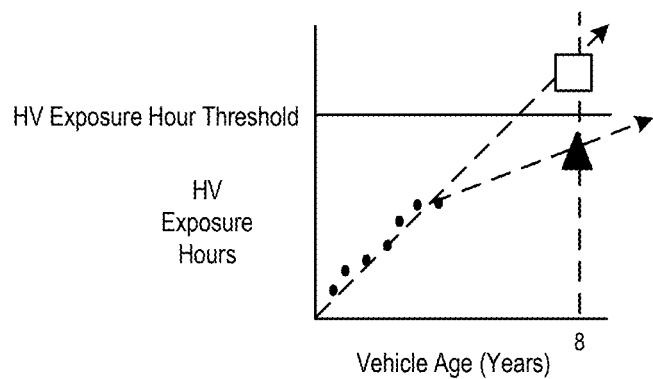
FIG. 6 is an exemplary graphical illustration of relationships between HV exposure hours of an EV as a function of vehicle age of the EV with respect to a HV exposure hour threshold in accordance with at least one embodiment.

Referring to FIG. 6, an exemplary graphical illustration of relationships between HV exposure hours of an EV 110 as a function of vehicle age of the EV 110 with respect to a HV exposure hour threshold in accordance with at least one embodiment is shown. The future vehicle age of 8 years is the vehicle age warranty for the EV 110. If the HV exposure hours go above the HV exposure hour threshold prior to the expiration of vehicle age warranty of 8 years, the warranty of certain HV components may be at risk. The projected HV exposure hours going above the HV exposure hour threshold may place the HV system components at a greater risk of failing while the EV 110 is under warranty. This may increase the risk of HV component failure leading to a warranty claim. It is desirable to limit non-propulsion functions (for example, offboard vehicle load(s) 136 and/or onboard accessory load(s) 132) when the projected HV exposure hours exceed the HV exposure hour threshold due to increased risk of HV component failure and resulting warranty cost.

The dots represent data points of HV exposure hours which include the current HV exposure hours and the historical HV exposure hours. The square represents the projected HV exposure hours based on continued usage of the battery system 112 to power offboard vehicle load(s) 136 and/or onboard accessory load(s) 132 in addition to propulsion loads at the future vehicle age of 8 years. The projected HV exposure hours based on continued usage of the battery system 112 to power offboard vehicle load(s) 136 and/or onboard accessory load(s) 132 in addition to propulsion loads at the future vehicle age of 8 years is greater than the HV exposure hour threshold. Since the projected HV exposure hours go above the HV exposure hour threshold prior to the expiration of vehicle age warranty of 8 years, the warranty of certain HV components may be at risk with continued usage of the battery system 112 to power offboard vehicle load(s) 136 and/or onboard accessory load(s) 132 in addition to the propulsion loads.

The triangle represents the projected HV exposure hours based on discontinuing usage of the battery system 112 to power offboard vehicle load(s) 136 and/or onboard accessory load(s) 132 at the future vehicle age of 8 years. The projected HV exposure hours based on discontinuing usage of the battery system 112 to power offboard vehicle load(s) 136 and/or onboard accessory load(s) 132 at the future vehicle age of 8 years remains below the HV exposure hour threshold. Since the projected HV exposure remains below the HV exposure hour threshold prior to the expiration of vehicle age warranty of 8 years, a HV exposure hour alert will be generated recommending discontinuing usage of the battery system 112 to power offboard vehicle load(s) 136 and/or onboard accessory load(s) 132 so that the HV system remains functional throughout the warranty period.

Figure 7:
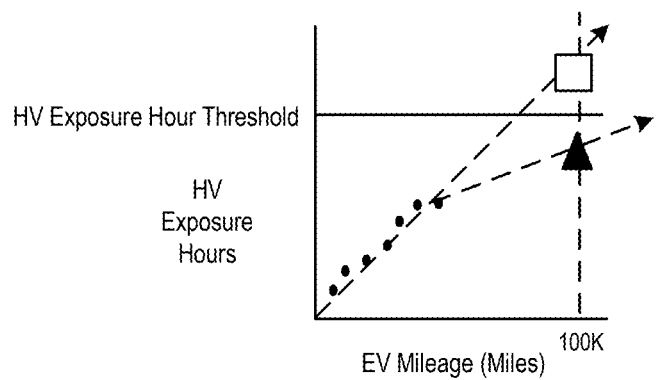
FIG. 7 is an exemplary graphical illustration of relationships between relationships between HV exposure hours of an EV as a function of EV mileage with respect to a HV exposure hour threshold in accordance with at least one embodiment.

Referring to FIG. 7, an exemplary graphical illustration of relationships between HV exposure hours of an EV 110 as a function of EV mileage with respect to a HV exposure hour threshold in accordance with at least one embodiment is shown. The future EV mileage of 100,000 miles is the vehicle mileage warranty for the EV 110. If the HV exposure hours go above the HV exposure hour threshold prior to the expiration of vehicle mileage warranty of 100,000 miles, the warranty of certain HV components may be at risk.

The dots represent the current HV exposure hours and historical HV exposure hours. The square represents the projected HV exposure hours based on continued usage of the battery system 112 to power offboard vehicle load(s) 136 and/or onboard accessory load(s) 132 in addition to propulsion loads at the future EV mileage of 100,000 miles. The projected HV exposure hours based on continued usage of the battery system 112 to power offboard vehicle load(s) 136 and/or onboard accessory load(s) 132 in addition to propulsion loads at the future EV mileage of 100,000 miles is greater than the HV exposure hour threshold. Since the projected HV exposure hours go above the HV exposure hour threshold prior to the expiration of vehicle mileage warranty of 100,000 miles, the warranty will become void with the continued usage of the battery system 112 to power offboard vehicle load(s) 136 and/or onboard accessory load(s) 132 in addition to propulsion loads.

The triangle represents the projected HV exposure hours based on discontinuing usage of the battery system 112 to power offboard vehicle load(s) 136 and/or onboard accessory load(s) 132 at the future EV mileage of 100,000 miles. The projected HV exposure hours based on discontinuing usage of the battery system 112 to power offboard vehicle load(s) 136 and/or onboard accessory load(s) 132 at the future EV mileage of 100,000 miles remains below the HV exposure hour threshold. Since the projected HV exposure remains below the HV exposure hour threshold prior to the expiration of vehicle mileage warranty of 100,000 miles, a HV exposure hour alert will be generated recommending discontinuing usage of the battery system 112 to power offboard vehicle load(s) 136 and/or onboard accessory load(s) 132 so that the HV system remains under warranty.

Figure 8:
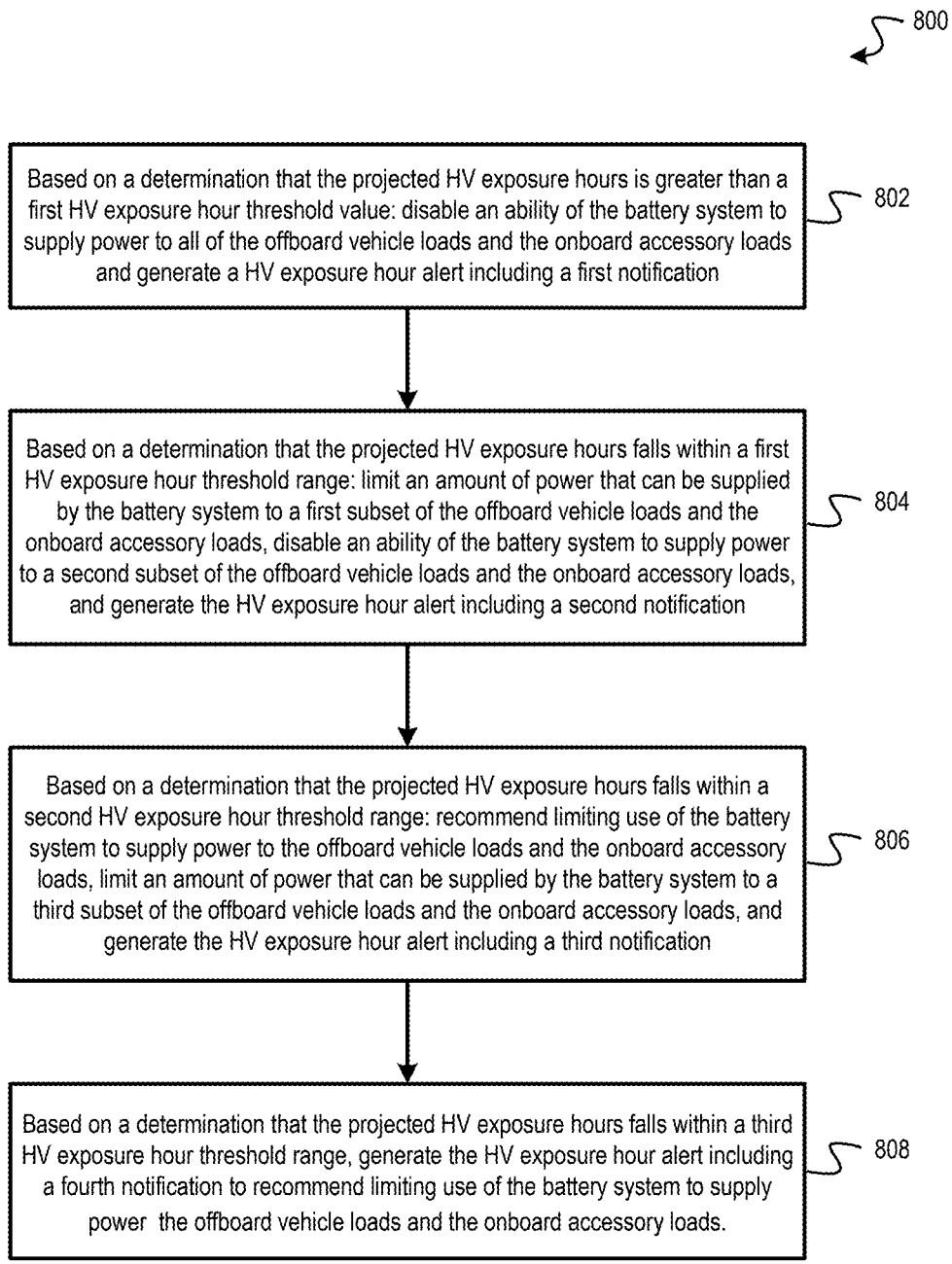
FIG. 8 is a flowchart representation of a method of generating HV exposure hour alerts associated with different HV exposure hour thresholds in accordance with at least one embodiment.

Referring to FIG. 8 a flowchart representation of a method 800 of generating HV exposure hour alerts associated with different HV exposure hour thresholds in accordance with at least one embodiment is shown. The method 800 will be described with reference to an exemplary implementation of the HV exposure hour monitoring system 144. As can be appreciated in light of the disclosure, the order of operation within the method 800 is not limited to the sequential execution as illustrated in FIG. 8. but may be performed in one or more varying orders as applicable and in accordance with the present disclosure.

At 802, based on a determination that the projected HV exposure hours is greater than a first HV exposure hour threshold value, the HV exposure hour monitoring system 144: disables an ability of the battery system to supply power to all of the offboard vehicle loads 136 and the onboard accessory loads 132 and generates a HV exposure hour alert including a first notification for display on the interface 148 of the EV 110. The first notification indicates that the ability of battery system to supply power to all of the offboard vehicle loads 136 and the onboard accessory loads 132 has been disabled. When the projected HV exposure hours are above the first threshold, the current HV exposure hours is critically high.

At 804, based on a determination that the projected HV exposure hours falls within a first HV exposure hour threshold range, the HV exposure hour monitoring system 144: limits an amount of power that can be supplied by the battery system 112 to a first subset of the offboard vehicle loads 136 and the onboard accessory loads 132, disables an ability of the battery system 112 to supply power to a second subset of the offboard vehicle loads 136 and the onboard accessory loads 132, and generates a HV exposure hour alert including a second notification for display on the interface 148 of the EV 110. The second notification indicates that the amount of power that can be supplied by the battery system 112 to the first subset the offboard vehicle loads 136 and the onboard accessory loads 132 has been limited and that the ability of the battery system 112 to supply power to a second subset of the offboard vehicle loads 136 and the onboard accessory loads 132 has been disabled. The first HV exposure hour threshold range is between the first HV exposure hour threshold value and a second HV exposure hour threshold value. The second HV exposure hour threshold value is less than the first HV exposure hour threshold value. When the projected HV exposure hours falls within the first HV exposure hour threshold range, the current HV exposure hours is very high.

At 806, based on a determination that the projected HV exposure hours falls within a second HV exposure hour threshold range, the HV exposure hour monitoring system 144: recommends limiting use of the battery system 112 to supply power to the offboard vehicle loads 136 and the onboard accessory loads 132, limits an amount of power that can be supplied by the battery system 112 to a third subset of the offboard vehicle loads 136 and the onboard accessory loads 132, and generates a HV exposure hour alert including a third notification for display on the interface 148 of the EV 110. The third notification includes a recommendation to limit use of the battery system 112 to power the offboard vehicle loads 136 and the onboard accessory loads 132 and indicates that the amount of power that can be supplied to the third subset of the offboard vehicle loads 136 and the onboard accessory loads 132 has been limited. The second HV exposure hour threshold range is between the second HV exposure hour threshold value and a third HV exposure hour threshold value. The third HV exposure hour threshold value is less than the second HV exposure hour threshold value. When the projected HV exposure hours falls within the second HV exposure hour threshold range, the current HV exposure hours is high.

At 808, based on a determination that the projected HV exposure hours falls within a third HV exposure hour threshold range, the HV exposure hour monitoring system 144 generates a HV exposure hour alert including a fourth notification. The fourth notification includes a recommendation to limit use of the battery system 112 to supply power to the offboard vehicle loads 136 and the onboard accessory loads 132. The third HV exposure hour threshold range is between the third HV exposure hour threshold value and a fourth HV exposure hour threshold value. The fourth HV exposure hour threshold value is less than the third HV exposure hour threshold value. When the projected HV exposure hours falls within the third HV exposure hour threshold range, the current HV exposure hours is slightly high.

In at least one embodiment, the HV exposure hour monitoring system 144 is configured to generate a first projected HV exposure hours at a future vehicle age. The future vehicle age is the vehicle age warranty. The projected HV exposure hours is based on the current HV exposure hours and the historical HV exposure hours. The current HV exposure hours and the historical HV exposure hours are based at least in part on the use of the battery system 112 to supply power to offboard vehicle loads 136 and/or onboard accessory loads in addition to propulsion loads. The HV exposure hour monitoring system 144 is configured to generate a second projected HV exposure hours at the future vehicle age. The second projected HV exposure hours is based on discontinuation of the use of the battery system to supply power to the offboard vehicle loads 136 and/or the onboard accessory loads 132. The HV exposure hour monitoring system 144 is configured to determine whether the first projected HV exposure hours is greater than the HV exposure hour threshold and the second projected HV exposure hours is less than the HV exposure hour threshold. The HV exposure hour monitoring system 144 is configured to generate a HV exposure hour alert for display on the interface 148 if the first projected HV exposure hours is greater than the HV exposure hour threshold and the second projected HV exposure hours is less than the HV exposure hour threshold. The HV exposure hour alert is associated with limitations in connection with the use of the battery system 112 to supply power to the offboard vehicle loads 136 and/or the onboard accessory loads 132. An example of an interface 148 is a display device of the EV 110.

In at least one embodiment, the HV exposure hour monitoring system 144 is configured to generate a first projected HV exposure hours at a future EV mileage. The future EV mileage is the vehicle mileage warranty. The projected HV exposure hours is based on the current HV exposure hours and the historical HV exposure hours. The current HV exposure hours and the historical HV exposure hours are based at least in part on the use of the battery system 112 to supply power to offboard vehicle loads 136 and/or onboard accessory loads 132 in addition to propulsion loads. The HV exposure hour monitoring system 144 is configured to generate a second projected HV exposure hours at the future vehicle mileage. The second projected HV exposure hours is based on discontinuation of the use of the battery system to supply power to the offboard vehicle loads 136 and/or the onboard accessory loads 132. The HV exposure hour monitoring system 144 is configured to determine whether the first projected HV exposure hours is greater than the HV exposure hour threshold and the second projected HV exposure hours is less than the HV exposure hour threshold. The HV exposure hour monitoring system 144 is configured to generate a HV exposure hour alert for display on the interface 148 if the first projected HV exposure hours is greater than the HV exposure hour threshold and the second projected HV exposure hours is less than the HV exposure hour threshold. The HV exposure hour alert is associated with limitations in connection with the use of the battery system 112 to supply power to the offboard vehicle loads 136 and/or the onboard accessory loads 132. An example of an interface 148 is a display device of the EV 110.

In at least one embodiment, the HV exposure hour monitoring system 144 is configured to generate a first projected HV exposure hours at a future vehicle age. The future vehicle age is the vehicle age warranty. The first projected HV exposure hours is based on the current HV exposure hours and historical HV exposure hours corresponding to historical vehicle ages. The HV exposure hour monitoring system 144 is configured to generate a second projected HV exposure hours at the future EV mileage. The future EV mileage is the vehicle mileage warranty. The second projected HV exposure hours is based on the current HV exposure hours and historical HV exposure hours corresponding to historical EV mileages. The HV exposure hour monitoring system 144 is configured to determine whether both the first projected HV exposure hours and the second projected HV exposure hours are greater than the HV exposure hour threshold. The HV exposure hour monitoring system 144 is configured to generate an HV exposure hour alert if both the first projected HV exposure hours and the second projected HV exposure hours are greater than the HV exposure hour threshold. The HV exposure hour alert is associated with limitations in connection with the use of the battery system 112 to supply power to the offboard vehicle loads 136 and/or the onboard accessory loads 132. An example of an interface 148 is a display device of the EV 110.

Figure 9:
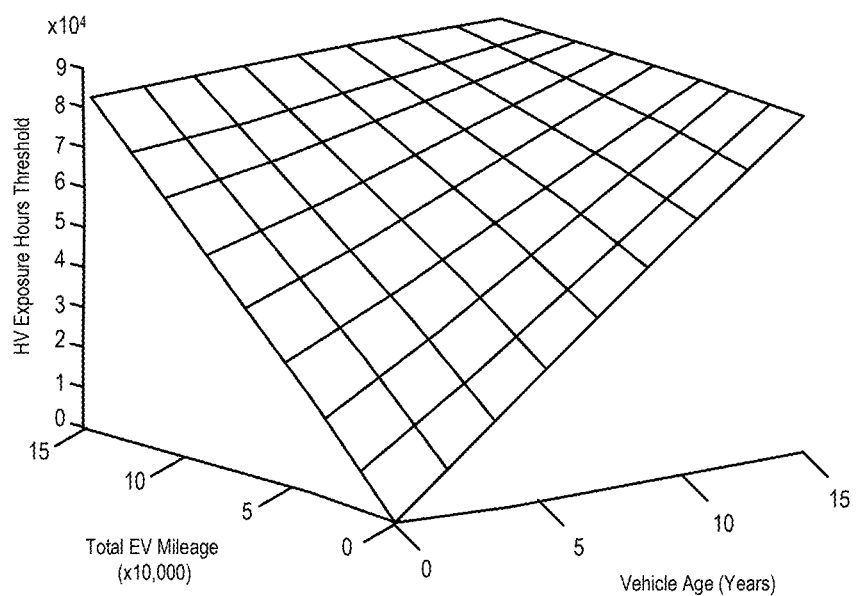
FIG. 9 is an exemplary graphical illustration of predefined relationships between HV exposure hours, vehicle ages, EV mileages, and HV exposure hour thresholds in accordance with at least one embodiment.

Referring to FIG. 9, an exemplary graphical illustration of pre-defined relationships between HV exposure hours, vehicle ages, EV mileages, and HV exposure hour thresholds in accordance with at least one embodiment is shown. Numerous hypothetical customer use cases are modeled for HV exposure hours across all conditions used to determine the HV exposure hour thresholds that are unlikely to meet warranty conditions for most customers without the implementation of limitations on the use of offboard vehicle loads 136 and/or onboard accessory loads 132.

The pre-defined relationships are based on interpolating between the following values (i) zero EV mileage and zero vehicle age-zero HV exposure hours, (ii) all values at the vehicle age warranty-[durability threshold] hours of HV exposure hours, and (iii) all values at vehicle warranty mileage-[durability threshold] hours of HV exposure hours. The HV exposure hours threshold is defined by the surface and is a function of current EV mileage and current vehicle age. A warranty period may, for example, be 8 years and/or 100,000 miles. A durability period may, for example, be 15 years and/or 150,000 miles. Other mile and/or year definitions corresponding to internal design requirement or aligned with any regulation or warranty may be used.

In at least one embodiment, the HV exposure hour monitoring system 144 is configured to determine the current HV exposure hours, a current vehicle age, and a current EV mileage. The HV exposure hour monitoring system 144 is configured to identify the HV exposure hour threshold associated with the current HV exposure hours, the current vehicle age, and the current EV mileage using pre-defined relationships between HV exposure hours, vehicle ages, EV mileages, and HV exposure hour thresholds illustrated in the exemplary graph.

In at least one embodiment, the HV exposure hour monitoring system 144 is configured to generate a projected number of cycles of HV contactors at a future vehicle age. The future vehicle age is the vehicle age warranty. The HV system is operably coupled to the battery system via the HV contactors. The projected number of cycles is based on a current number of cycles and historical numbers of cycles. The current number of cycles and the historical numbers of cycles are based on the closing of the HV contactors to enable the battery system to supply power to the propulsion loads and the offboard vehicle loads 136 and/or onboard accessory loads 132. The HV exposure hour monitoring system 144 is configured to determine whether the projected number of cycles is greater than a cycle threshold at the future vehicle age. If the projected number of cycles is greater than a cycle threshold at the future vehicle age, the HV exposure hour monitoring system 144 is configured to generate a cycle alert associated with limitations in connection with the use of the battery system 112 to supply power to the offboard vehicle loads 136 and/or the onboard accessory loads 132 for display on a display device of the EV 110.

In at least one embodiment, the HV exposure hour monitoring system 144 is configured to generate a projected number of cycles of HV contactors at a future EV mileage. The future EV mileage is the vehicle mileage warranty. The HV system is operably coupled to the battery system via the HV contactors. The projected number of cycles is based on a current number of cycles and historical numbers of cycles. The current number of cycles and the historical numbers of cycles are based on the closing of the HV contactors to enable the battery system to supply power to the propulsion loads and the offboard vehicle loads 136 and/or onboard accessory loads 132. The HV exposure hour monitoring system 144 is configured to determine whether the projected number of cycles is greater than a cycle threshold at the future EV mileage. If the projected number of cycles is greater than a cycle threshold at the future vehicle mileage, the HV exposure hour monitoring system 144 is configured to generate a cycle alert associated with limitations in connection with the use of the battery system 112 to supply power to the offboard vehicle loads 136 and/or the onboard accessory loads 132 for display on a display device of the EV 110.

In at least one embodiment, the HV exposure hour monitoring system 144 is configured to generate the current HV exposure hours based on a sum of the time durations that the HV contactors have been closed during the cycles and generate each of the historical HV exposure hours based on sums of the time durations that the HV contactors have been closed at each of the historical vehicle ages.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A high voltage (HV) exposure hour monitoring system of an electric vehicle (EV) comprising:
    at least one processor; and
    at least one memory communicatively coupled to the at least one processor, the at least one memory comprising instructions that upon execution by the at least one processor, cause the at least one processor to:
        generate projected HV exposure hours for a HV system of the EV at one of a future vehicle age and a future EV mileage, wherein:
            the HV system is operably coupled to a battery system of the EV and is configured to enable a supply of power from the battery system to propulsion loads and at least one of offboard vehicle loads and onboard accessory loads;
            the projected HV exposure hours is based on current HV exposure hours and historical HV exposure hours for the HV system; and
            the current HV exposure hours and the historical HV exposure hours are based on use of the battery system for the supply of power to the propulsion loads and the at least one of the offboard vehicle loads and the onboard accessory loads;
        based on a determination that the projected HV exposure hours is greater than a first HV exposure hour threshold at the one of the future vehicle age and the future EV mileage;
        generate a HV exposure hour alert associated with limitations in connection with the use of the battery system for the supply of power to the at least one of the offboard vehicle loads and the onboard accessory loads for display on a display device of the EV;
        disable an ability of the battery system to supply power to all of the at least one of the offboard vehicle loads and the onboard accessory loads; and
        generate the HV exposure hour alert, the HV exposure hour alert comprising a first notification that the ability of the battery system to supply power to the all of the at least one of the offboard vehicle loads and the onboard accessory loads has been disabled.

2. The system of claim 1, wherein the at least one memory comprises further instructions that upon execution by the at least one processor, cause the at least one processor to:
generate the projected HV exposure hours at the one of the future vehicle age and the future EV mileage, wherein:
the projected HV exposure hours is based on the current HV exposure hours and the historical HV exposure hours; and
the current HV exposure hours and the historical HV exposure hours are based at least in part on the use of the battery system to supply power to the at least one of the offboard vehicle loads and the onboard accessory loads;
generate another projected HV exposure hours at the one of the future vehicle age and the future EV mileage, wherein the another projected HV exposure hours is based on discontinuation of the use of the battery system to supply power to the at least one of the offboard vehicle loads and the onboard accessory loads;
determine whether the projected HV exposure hours is greater than the first HV exposure hour threshold and the another projected HV exposure hours is less than the first HV exposure hour threshold; and
generate the HV exposure hour alert based on a determination that the projected HV exposure hours is greater than the first HV exposure hour threshold and the another projected HV exposure hours is less than the first HV exposure hour threshold.

3. The system of claim 1, wherein based on a determination that the projected HV exposure hours falls within a first HV exposure hour threshold range between the first HV exposure hour threshold value and a second HV exposure hour threshold value, the second HV exposure hour threshold value being less than the first HV exposure hour threshold value, the at least one memory comprises further instructions that upon execution by the at least one processor, cause the at least one processor to:
limit an amount of power that can be supplied by the battery system to a first subset of the at least one of the offboard vehicle loads and the onboard accessory loads;
disable an ability of the battery system to supply power to a second subset of the at least one of the offboard vehicle loads and the onboard accessory loads; and
generate the HV exposure hour alert, the HV exposure hour alert comprising a second notification that the amount of power that can be supplied by the battery system to the first subset of the at least one of the offboard vehicle loads and the onboard accessory loads has been limited and that the ability of the battery system to supply power to the second subset of the at least one of the offboard vehicle loads and the onboard accessory loads has been disabled.

4. The system of claim 3, wherein based on a determination that the projected HV exposure hours fall within a second HV exposure hour threshold range, wherein the second HV exposure hour threshold range is between the second HV exposure hour threshold value and a third HV exposure hour threshold value and the third HV exposure hour threshold value is less than the second HV exposure hour threshold value, the at least one memory comprises further instructions that upon execution by the at least one processor, cause the at least one processor to:
recommend limiting use of the battery system to supply power to the at least one of the offboard vehicle loads and the onboard accessory loads;
limit an amount of power supplied by the battery system to a third subset of the at least one of the offboard vehicle loads and the onboard accessory loads; and
generate the HV exposure hour alert, the HV exposure hour alert comprising a third notification to recommend limiting use of the battery system to supply power to the at least one of the offboard vehicle loads and the onboard accessory loads and that the amount of power that can be supplied to the third subset of the at least one of the offboard vehicle loads and the onboard accessory loads has been limited.

5. The system of claim 4, wherein based on a determination that the projected HV exposure hours fall within a third HV exposure hour threshold range, wherein the third HV exposure hour threshold range is between the third HV exposure hour threshold value and a fourth HV exposure hour threshold value and the fourth HV exposure hour threshold value is less than the third HV exposure hour threshold value, the at least one memory comprises further instructions that upon execution by the at least one processor, cause the at least one processor to generate the HV exposure hour alert, the HV exposure hour alert comprising a fourth notification to recommend limiting use of the battery system to supply power to the at least one of the offboard vehicle loads and the onboard accessory loads.

6. The system of claim 1, wherein the at least one memory comprises further instructions that upon execution by the at least one processor, cause the at least one processor to:
generate the projected HV exposure hours at the future vehicle age, wherein the projected HV exposure hours is based on the current HV exposure hours and the historical HV exposure hours corresponding to historical vehicle ages; and
determine whether the projected HV exposure hours is greater than the first HV exposure hour threshold at the future vehicle age.

7. The system of claim 6, wherein the at least one memory comprises further instructions that upon execution by the at least one processor, cause the at least one processor to generate the projected HV exposure hours at the future vehicle age, wherein the projected HV exposure hours is based on the current HV exposure hours and the historical HV exposure hours corresponding to the historical vehicle ages within a pre-defined vehicle age window.

8. The system of claim 1, wherein the future vehicle age is a vehicle age warranty.

9. The system of claim 1, wherein the at least one memory comprises further instructions that upon execution by the at least one processor, cause the at least one processor to:
generate the projected HV exposure hours at the future EV mileage, wherein the projected HV exposure hours is based on the current HV exposure hours at a current EV mileage and the historical HV exposure hours corresponding to historical EV mileages; and
determine whether the projected HV exposure hours is greater than the first HV exposure hour threshold at the future EV mileage.

10. The system of claim 9, wherein the at least one memory comprises further instructions that upon execution by the at least one processor, cause the at least one processor to generate the projected HV exposure hours at the future EV mileage, wherein the projected HV exposure hours is based on the current HV exposure hours and the historical HV exposure hours corresponding to historical EV mileages within a pre-defined EV mileage window.

11. The system of claim 1, wherein the future EV mileage is a vehicle warranty mileage.

12. The system of claim 1, wherein the at least one memory comprises further instructions that upon execution by the at least one processor, cause the at least one processor to:
   determine the current HV exposure hours;
   determine a current vehicle age;
   determine a current EV mileage; and
   identify the first HV exposure hour threshold associated with the current HV exposure hours, the current vehicle age, and the current EV mileage using pre-defined relationships between HV exposure hours, vehicle ages, EV mileages, and HV exposure hour thresholds.

13. The system of claim 1, wherein the at least one memory comprises further instructions that upon execution by the at least one processor, cause the at least one processor to:
   generate a first projected HV exposure hours at the future vehicle age, wherein the first projected HV exposure hours is based on the current HV exposure hours and the historical HV exposure hours corresponding to historical vehicle ages;
   generate a second projected HV exposure hours at the future EV mileage, wherein the second projected HV exposure hours is based on the current HV exposure hours and the historical HV exposure hours corresponding to historical EV mileages;
   determine whether both the first projected HV exposure hours and the second projected HV exposure hours are greater than the first HV exposure hour threshold; and
   generate the HV exposure hour alert based on a determination that both the first projected HV exposure hours and the second projected HV exposure hours are greater than the first HV exposure hour threshold.

14. The system of claim 1, wherein at least one of the onboard accessory loads comprises a connected camera system.

15. The system of claim 1 wherein the offboard vehicle loads comprises at least one of a vehicle to grid (V2G), vehicle to home (V2H), vehicle to vehicle (V2V), vehicle to load (V2L), power take off (PTO), and electronic PTO.

16. The system of claim 1, wherein the at least one memory comprises further instructions that upon execution by the at least one processor, cause the at least one processor to:
   generate a projected number of cycles of HV contactors at the one of the future vehicle age and the future EV mileage, wherein:
      the HV system is operably coupled to the battery system via the HV contactors;
      a projected number of cycles is based on a current number of cycles and a historical number of cycles; and
      the current number of cycles and the historical number of cycles are based on closing of the HV contactors to enable the battery system to supply power to the propulsion loads and the at least one of offboard vehicle loads and onboard accessory loads;
   determine whether the projected number of cycles is greater than a cycle threshold at the one of the future vehicle age and the future EV mileage; and
   generate a cycle alert associated with limitations in connection with the use of the battery system to supply power to the at least one of the offboard vehicle loads and the onboard accessory loads for display on the display device of the EV based on a determination that the projected number of cycles is greater than the cycle threshold at the one of the future vehicle age and the future EV mileage.

17. The system of claim 16, wherein the at least one memory comprises further instructions that upon execution by the at least one processor, cause the at least one processor to:
   generate the current HV exposure hours based on a sum of time durations that the HV contactors have been closed during cycles of the HV contactors; and
   generate each of the historical HV exposure hours based on sums of the time durations that the HV contactors have been closed at each of the historical vehicle ages.

18. A method for monitoring high voltage (HV) exposure hours of an electric vehicle (EV) comprising:
   generating projected HV exposure hours for a HV system of the EV at one of a future vehicle age and a future EV mileage, wherein:
      the HV system is operably coupled to a battery system of the EV and is configured to enable a supply of power from the battery system to propulsion loads and at least one of offboard vehicle loads and onboard accessory loads;
      the projected HV exposure hours is based on current HV exposure hours and historical HV exposure hours for the HV system; and
      the current HV exposure hours and the historical HV exposure hours are based on use of the battery system to supply power to the propulsion loads and the at least one of offboard vehicle loads and onboard accessory loads;
   based on a determination that the projected HV exposure hours is greater than a first HV exposure hour threshold at the one of the future vehicle age and the future EV mileage:
      generating a HV exposure hour alert associated with limitations in connection with the use of the battery system to supply power to the at least one of the offboard vehicle loads and the onboard accessory loads for display on a display device of the EV;
      disabling an ability of the battery system to supply power to all of the at least one of the offboard vehicle loads and the onboard accessory loads; and
      generating the HV exposure hour alert, the HV exposure hour alert comprising a first notification that the ability of the battery system to supply power to the all of the at least one of the offboard vehicle loads and the onboard accessory loads has been disabled.

19. An electric vehicle (EV) comprising:
   at least one processor; and
   at least one memory communicatively coupled to the at least one processor, the at least one memory comprising instructions that upon execution by the at least one processor, cause the at least one processor to:
      generate projected HV exposure hours for a HV system of the EV at one of a future vehicle age and a future EV mileage, wherein:
         the HV system is operably coupled to a battery system of the EV and is configured to enable a supply of power from the battery system to propulsion loads and at least one of offboard vehicle loads and onboard accessory loads;
         the projected HV exposure hours is based on current HV exposure hours and historical HV exposure hours for the HV system; and the current HV exposure hours and the historical HV exposure hours are based on use of the battery system to supply power to the propulsion loads and the at least one of offboard vehicle loads and onboard accessory loads;

based on a determination that the projected HV exposure hours is greater than a first HV exposure hour threshold at the one of the future vehicle age and the future EV mileage:
  generate a HV exposure hour alert associated with limitations in connection with the use of the battery system to supply power to the at least one of the offboard vehicle loads and the onboard accessory loads for display on a display device of the EV;
  disable an ability of the battery system to supply power to all of the at least one of the offboard vehicle loads and the onboard accessory loads; and
  generate the HV exposure hour alert, the HV exposure hour alert comprising a first notification that the ability of the battery system to supply power to the all of the at least one of the offboard vehicle loads and the onboard accessory loads has been disabled.

20. The EV of claim 19, wherein based on a determination that the projected HV exposure hours falls within a first HV exposure hour threshold range, wherein the first HV exposure hour range is between the first HV exposure hour threshold value and a second HV exposure hour threshold value, the second HV exposure hour threshold value being less than the first HV exposure hour threshold value, the at least one memory comprises further instructions that upon execution by the at least one processor, cause the at least one processor to:
  limit an amount of power that can be supplied by the battery system to a first subset of the at least one of the offboard vehicle loads and the onboard accessory loads;
  disable an ability of the battery system to supply power to a second subset of the at least one of the offboard vehicle loads and the onboard accessory loads; and
  generate the HV exposure hour alert, the HV exposure hour alert comprising a second notification that the amount of power that can be supplied by the battery system to the first subset of the at least one of the offboard vehicle loads and the onboard accessory loads has been limited and that the ability of the battery system to supply power to the second subset of the at least one of the offboard vehicle loads and the onboard accessory loads has been disabled.

* * * * *